W. HARPER.
NUT LOCK.
APPLICATION FILED JUNE 28, 1916.
1,206,322.
Patented Nov. 28, 1916.
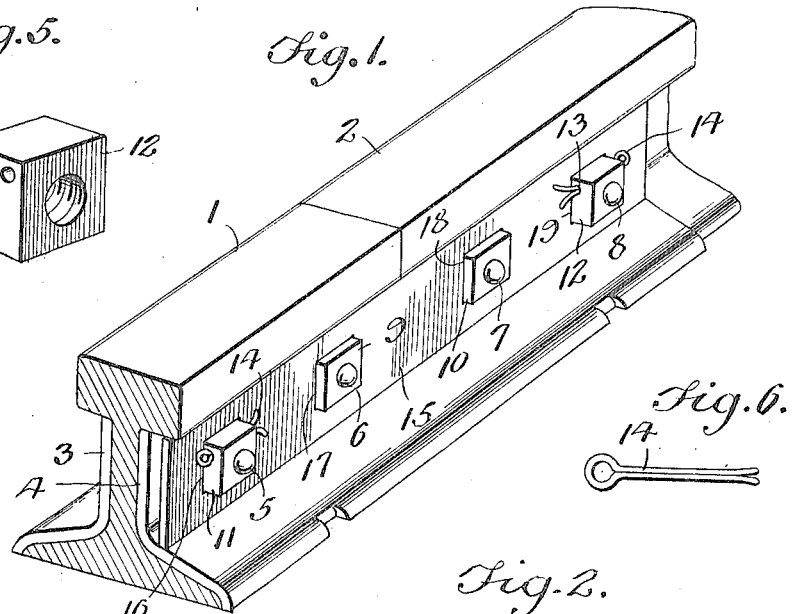
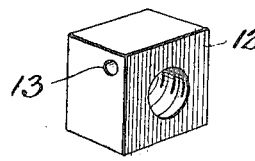
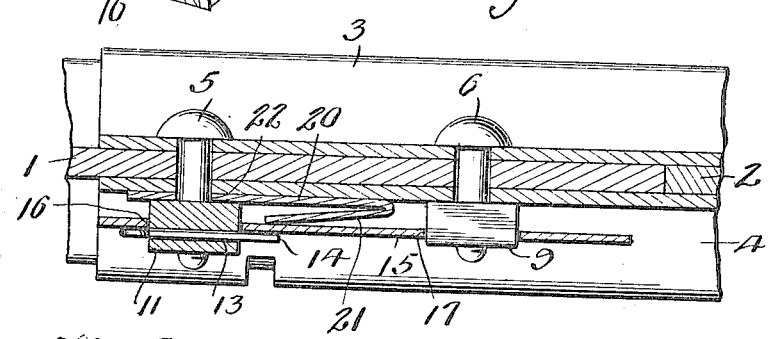
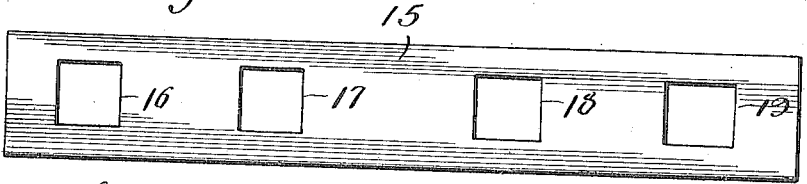
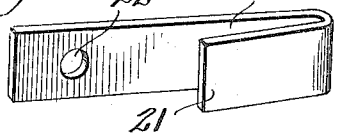
Inventor
Walter Harper,
By Victor J. Evans
Attorney
Witness

UNITED STATES PATENT OFFICE.

WALTER HARPER, OF WEBSTER, PENNSYLVANIA.

NUT-LOCK.

1,206,322.  Specification of Letters Patent. Patented Nov. 28, 1916.

Application filed June 28, 1916. Serial No. 106,436.

*To all whom it may concern:*

Be it known that I, WALTER HARPER, a citizen of the United States, residing at Webster, in the county of Westmoreland and State of Pennsylvania, have invented new and useful Improvements in Nut-Locks, of which the following is a specification.

This invention relates to nut locks and those particularly designed for connection with rail joints and the like.

In the drawings, Figure 1, is a perspective view of a joint to which my invention is applied. Fig. 2, is a cross sectional view of a pair of adjacent rails and fish plates to which my invention is applied. Fig. 3, is a detail perspective view of one of the anti-rattling springs. Fig. 4, is an elevational view of the lock bar. Fig. 5, is a detail perspective view of one of the end nuts. Fig. 6, is a detail view of the cotter pin.

Referring now to the drawings by numerals of reference 1, and 2, are adjacent rails provided with usual fish plates 3 and 4. The fish plates are shown as being connected to the rails by the bolts 5, 6, 7, and 8. The bolts are provided with the usual nuts 9 and 10. The end bolts 5 and 6 are provided with nuts 11 and 12, with greater thickness than those designed by 7 and 8.

By referring to Fig. 5, it will be observed that the end nuts are provided with transverse openings 13 one of which is shown as a cotter pin (see Fig. 6).

15, designates a lock bar illustrated in Fig. 4 as being provided with rectangular openings 16, 17, 18 and 19 to fit over the nuts 5 to 8 both inclusive.

It is to be understood that the number of openings in the bar may be varied to suit varying conditions.

20 designates a spring provided with an end 21 bent back upon the body portion of the spring and adapted to bear against the bar 15, said spring also being provided with an opening 22 to be received upon the end of the bolt 5. It is to be understood that the spring 20 may be supported upon the bolts 5 and 6 one bolt passing through the opening 22 and the end 21 of the spring lying between the bar and fish plate as shown in Fig. 2.

In assembling the parts the fish plates will bear against the sides of the rails in the usual manner and the springs will be threaded upon the bolts 5 and 6. The nuts are then screwed in place and the bar 15 is moved into position so that the nuts are received in recesses 16, 17, 18, and 19 in the bar 15 by pressing the bar toward the fish plates or against the spring or springs. The other spring may be inserted in the openings 13 as shown in Fig. 1.

I prefer to provide the lower edge of the bar 15 with beveled edge so it will be rested against the flange of the fish plate 4.

Inasmuch as the outward portion 2 of the spring 20 will have a tendency to force the bar 15 against the cotter pin the rattling of the bar due to the passage of the wheels over the rails will be materially reduced.

Inasmuch as the edges of the openings 16 to 19 both inclusive bear against the nuts it will be impossible for the nuts to turn and therefore become loose.

It will be apparent that nuts constructed according to my invention can be readily applied and removed without materially changing the construction of the rail joint.

The device is adapted to be applied to the ordinary rail simply by substituting the end nuts 11 and 12 which is a great advantage over those now in use.

What I claim is:—

In combination, a fish plate, bolts passing therethrough, and supporting nuts, one of which has a through opening, a locking bar having openings snugly receiving the nuts, a pin arranged in the opening of said nut and abutting said bar and a leaf spring having one end gripped between the nut with the opening and said fish plate and its other end resiliently engaging said bar for holding the latter in a tight engagement with said pin.

In testimony whereof I affix my signature in presence of two witnesses.

WALTER HARPER.

Witnesses:
GEORGE MALTZ,
CLYDE S. LEWIS.